(12) United States Patent
Kato et al.

(10) Patent No.: US 8,400,365 B2
(45) Date of Patent: Mar. 19, 2013

(54) ANTENNA DEVICE AND MOBILE COMMUNICATION TERMINAL

(75) Inventors: Noboru Kato, Nagaokakyo (JP); Jun Sasaki, Nagaokakyo (JP); Teppei Miura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/425,505

(22) Filed: Mar. 21, 2012

(65) Prior Publication Data

US 2012/0176282 A1    Jul. 12, 2012

Related U.S. Application Data

(63) Continuation of application No. PCT/JP2010/070607, filed on Nov. 18, 2010.

(30) Foreign Application Priority Data

Nov. 20, 2009 (JP) ................................. 2009-265219

(51) Int. Cl.
H01Q 1/24 (2006.01)
H04B 5/00 (2006.01)
G08B 13/14 (2006.01)

(52) U.S. Cl. ...................... 343/702; 455/41.1; 340/572.7

(58) Field of Classification Search ............ 343/702, 343/700 MS, 895, 867, 748, 788; 340/572.7; 455/334, 41.1
See application file for complete search history.

(56) References Cited

U.S. PATENT DOCUMENTS

| | | | |
|---|---|---|---|
| 3,364,564 A | 1/1968 | Kurtz et al. | |
| 4,745,401 A * | 5/1988 | Montean | 340/572.3 |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,581,257 A * | 12/1996 | Greene et al. | 342/51 |
| 5,757,074 A | 5/1998 | Matloubian et al. | |
| 5,854,480 A | 12/1998 | Noto | |
| 5,903,239 A | 5/1999 | Takahashi et al. | |

(Continued)

FOREIGN PATENT DOCUMENTS

| | | |
|---|---|---|
| CA | 2 279 176 A1 | 7/1998 |
| DE | 10 2006 057 369 A1 | 6/2008 |

(Continued)

OTHER PUBLICATIONS

Official Communication issued in International Patent Application No. PCT/JP2009/069486, mailed on Mar. 2, 2010.

(Continued)

*Primary Examiner* — Huedung Mancuso
(74) *Attorney, Agent, or Firm* — Keating & Bennett, LLP

(57) ABSTRACT

An antenna device includes a feeding member including a coil pattern and an emitting member to emit a transmit signal supplied from the feeding member and to receive a receive signal and supplying it to the feeding member. The emitting member includes an opening portion and a slit portion communicating with the opening portion. When seen in plan view from the direction of the winding axis of the coil pattern, the opening portion of the emitting member and the inner region of the coil pattern overlap each other, and the emitting member and the coil pattern overlap each other at least partially.

16 Claims, 12 Drawing Sheets

U.S. PATENT DOCUMENTS

| | | |
|---|---|---|
| 5,923,300 A * | 7/1999 | Mejia .................... 343/788 |
| 5,936,150 A | 8/1999 | Kobrin et al. |
| 5,955,723 A | 9/1999 | Reiner |
| 5,995,006 A | 11/1999 | Walsh |
| 6,104,611 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,243,045 B1 | 6/2001 | Ishibashi |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,227,504 B2 * | 6/2007 | Deguchi et al. ............... 343/742 |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0194591 A1 * | 9/2005 | Usami et al. .................. 257/48 |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044111 A1 * | 3/2006 | Kollar et al. ................... 340/10.1 |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0070003 A1 | 3/2008 | Nakatani et al. |
| 2008/0087990 A1 | 4/2008 | Kato et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0272885 A1 | 11/2008 | Atherton |
| 2009/0002130 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0109102 A1 | 4/2009 | Dokai et al. |
| 2009/0160719 A1 | 6/2009 | Kato et al. |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0308118 A1 | 12/2010 | Kataya et al. |
| 2011/0031320 A1 | 2/2011 | Kato et al. |
| 2011/0063184 A1 | 3/2011 | Furumura et al. |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |
| EP | 1 701 296 A2 | 9/2006 |
| EP | 1 703 589 A1 | 9/2006 |
| EP | 1 742 296 A1 | 1/2007 |
| EP | 1 744 398 A1 | 1/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |

| | | | | | | |
|---|---|---|---|---|---|---|
| EP | 1 993 170 A1 | 11/2008 | | JP | 2000-132643 A | 5/2000 |
| EP | 2 009 738 A1 | 12/2008 | | JP | 2000-137778 A | 5/2000 |
| EP | 2 012 258 A1 | 1/2009 | | JP | 2000-137779 A | 5/2000 |
| EP | 2 096 709 A1 | 9/2009 | | JP | 2000-137785 A | 5/2000 |
| EP | 2 148 449 A1 | 1/2010 | | JP | 2000-148948 A | 5/2000 |
| EP | 2 251 934 A1 | 11/2010 | | JP | 2000-172812 A | 6/2000 |
| GB | 2 305 075 A | 3/1997 | | JP | 2000-209013 A | 7/2000 |
| GB | 2461443 A | 1/2010 | | JP | 2000-222540 A | 8/2000 |
| JP | 50-143451 A | 11/1975 | | JP | 2000-510271 A | 8/2000 |
| JP | 61-284102 A | 12/1986 | | JP | 2000-242754 A | 9/2000 |
| JP | 62-127140 U | 8/1987 | | JP | 2000-243797 A | 9/2000 |
| JP | 02-164105 A | 6/1990 | | JP | 2000-251049 A | 9/2000 |
| JP | 02-256208 A | 10/1990 | | JP | 2000-261230 A | 9/2000 |
| JP | 3-171385 A | 7/1991 | | JP | 2000-276569 A | 10/2000 |
| JP | 03-503467 A | 8/1991 | | JP | 2000-286634 A | 10/2000 |
| JP | 03-262313 A | 11/1991 | | JP | 2000-286760 A | 10/2000 |
| JP | 04-150011 A | 5/1992 | | JP | 2000-311226 A | 11/2000 |
| JP | 04-167500 A | 6/1992 | | JP | 2000-321984 A | 11/2000 |
| JP | 04-096814 U | 8/1992 | | JP | 2000-349680 A | 12/2000 |
| JP | 04-101168 U | 9/1992 | | JP | 2001-10264 A | 1/2001 |
| JP | 04-134807 U | 12/1992 | | JP | 2001-028036 A | 1/2001 |
| JP | 05-327331 A | 12/1993 | | JP | 2001-043340 A | 2/2001 |
| JP | 6-53733 A | 2/1994 | | JP | 3075400 U | 2/2001 |
| JP | 06-077729 A | 3/1994 | | JP | 2001-66990 A | 3/2001 |
| JP | 06-177635 A | 6/1994 | | JP | 2001-76111 A | 3/2001 |
| JP | 6-260949 A | 9/1994 | | JP | 2001-084463 A | 3/2001 |
| JP | 07-183836 A | 7/1995 | | JP | 2001-101369 A | 4/2001 |
| JP | 08-055725 A | 2/1996 | | JP | 2001-505682 A | 4/2001 |
| JP | 08-056113 A | 2/1996 | | JP | 2001-168628 A | 6/2001 |
| JP | 8-87580 A | 4/1996 | | JP | 2001-188890 A | 7/2001 |
| JP | 08-088586 A | 4/1996 | | JP | 2001-240046 A | 9/2001 |
| JP | 08-88586 A | 4/1996 | | JP | 2001-240217 A | 9/2001 |
| JP | 08-176421 A | 7/1996 | | JP | 2001-256457 A | 9/2001 |
| JP | 08-180160 A | 7/1996 | | JP | 2001-257292 A | 9/2001 |
| JP | 08-279027 A | 10/1996 | | JP | 2001-514777 A | 9/2001 |
| JP | 08-307126 A | 11/1996 | | JP | 2001-291181 A | 10/2001 |
| JP | 08-330372 A | 12/1996 | | JP | 2001-319380 A | 11/2001 |
| JP | 09-014150 A | 1/1997 | | JP | 2001-331976 A | 11/2001 |
| JP | 09-035025 A | 2/1997 | | JP | 2001-332923 A | 11/2001 |
| JP | 9-93029 A | 4/1997 | | JP | 2001-339226 A | 12/2001 |
| JP | 09-093029 A | 4/1997 | | JP | 2001-344574 A | 12/2001 |
| JP | 09-245381 A | 9/1997 | | JP | 2001-351083 A | 12/2001 |
| JP | 09-252217 A | 9/1997 | | JP | 2001-351084 A | 12/2001 |
| JP | 09-270623 A | 10/1997 | | JP | 2001-352176 A | 12/2001 |
| JP | 09-284038 A | 10/1997 | | JP | 2001-358527 A | 12/2001 |
| JP | 9-512367 A | 12/1997 | | JP | 2002-024776 A | 1/2002 |
| JP | 10-069533 A | 3/1998 | | JP | 2002-026513 A | 1/2002 |
| JP | 10-69533 A | 3/1998 | | JP | 2002-32731 A | 1/2002 |
| JP | 10-505466 A | 5/1998 | | JP | 2002-042076 A | 2/2002 |
| JP | 10-171954 A | 6/1998 | | JP | 2002-063557 A | 2/2002 |
| JP | 10-173427 A | 6/1998 | | JP | 2002-505645 A | 2/2002 |
| JP | 10-193849 A | 7/1998 | | JP | 2002-076750 A | 3/2002 |
| JP | 10-193851 A | 7/1998 | | JP | 2002-76750 A | 3/2002 |
| JP | 10-293828 A | 11/1998 | | JP | 2002-111363 A | 4/2002 |
| JP | 10-334203 A | 12/1998 | | JP | 2002-150245 A | 5/2002 |
| JP | 11-025244 A | 1/1999 | | JP | 2002-157564 A | 5/2002 |
| JP | 11-039441 A | 2/1999 | | JP | 2002-158529 A | 5/2002 |
| JP | 11-075329 A | 3/1999 | | JP | 2002-175508 A | 6/2002 |
| JP | 11-085937 A | 3/1999 | | JP | 2002-183690 A | 6/2002 |
| JP | 11-88241 A | 3/1999 | | JP | 2002-185358 A | 6/2002 |
| JP | 11-102424 A | 4/1999 | | JP | 2002-204117 A | 7/2002 |
| JP | 11-103209 A | 4/1999 | | JP | 2002-522849 A | 7/2002 |
| JP | 11-149536 A | 6/1999 | | JP | 2002-230128 A | 8/2002 |
| JP | 11-149537 A | 6/1999 | | JP | 2002-232221 A | 8/2002 |
| JP | 11-149538 A | 6/1999 | | JP | 2002-246828 A | 8/2002 |
| JP | 11-175678 A | 7/1999 | | JP | 2002-252117 A | 9/2002 |
| JP | 11-219420 A | 8/1999 | | JP | 2002-259934 A | 9/2002 |
| JP | 11-220319 A | 8/1999 | | JP | 2002-280821 A | 9/2002 |
| JP | 11-282993 A | 10/1999 | | JP | 2002-298109 A | 10/2002 |
| JP | 11-328352 A | 11/1999 | | JP | 2002-308437 A | 10/2002 |
| JP | 11-331014 A | 11/1999 | | JP | 2002-319008 A | 10/2002 |
| JP | 11-346114 A | 12/1999 | | JP | 2002-319009 A | 10/2002 |
| JP | 11-515094 A | 12/1999 | | JP | 2002-319812 A | 10/2002 |
| JP | 2000-21128 A | 1/2000 | | JP | 2002-362613 A | 12/2002 |
| JP | 2000-021639 A | 1/2000 | | JP | 2002-366917 A | 12/2002 |
| JP | 2000-022421 A | 1/2000 | | JP | 2002-373029 A | 12/2002 |
| JP | 2000-059260 A | 2/2000 | | JP | 2002-373323 A | 12/2002 |
| JP | 2000-085283 A | 3/2000 | | JP | 2002-374139 A | 12/2002 |
| JP | 2000-090207 A | 3/2000 | | JP | 2003-006599 A | 1/2003 |

| | | | | | | |
|---|---|---|---|---|---|---|
| JP | 2003-016412 A | 1/2003 | | JP | 2005-18156 A | 1/2005 |
| JP | 2003-022912 A | 1/2003 | | JP | 2005-033461 A | 2/2005 |
| JP | 2003-026177 A | 1/2003 | | JP | 2005-124061 A | 5/2005 |
| JP | 2003-030612 A | 1/2003 | | JP | 2005-128592 A | 5/2005 |
| JP | 2003-037861 A | 2/2003 | | JP | 2005-129019 A | 5/2005 |
| JP | 2003-44789 A | 2/2003 | | JP | 2005-135132 A | 5/2005 |
| JP | 2003-046318 A | 2/2003 | | JP | 2005-136528 A | 5/2005 |
| JP | 2003-58840 A | 2/2003 | | JP | 2005-137032 A | 5/2005 |
| JP | 2003-067711 A | 3/2003 | | JP | 3653099 B2 | 5/2005 |
| JP | 2003-069335 A | 3/2003 | | JP | 2005-165839 A | 6/2005 |
| JP | 2003-076947 A | 3/2003 | | JP | 2005-167327 A | 6/2005 |
| JP | 2003-76963 A | 3/2003 | | JP | 2005-167813 A | 6/2005 |
| JP | 2003-78333 A | 3/2003 | | JP | 2005-190417 A | 7/2005 |
| JP | 2003-078336 A | 3/2003 | | JP | 2005-191705 A | 7/2005 |
| JP | 2003-085501 A | 3/2003 | | JP | 2005-192124 A | 7/2005 |
| JP | 2003-085520 A | 3/2003 | | JP | 2005-210223 A | 8/2005 |
| JP | 2003-87008 A | 3/2003 | | JP | 2005-210676 A | 8/2005 |
| JP | 2003-87044 A | 3/2003 | | JP | 2005-210680 A | 8/2005 |
| JP | 2003-099184 A | 4/2003 | | JP | 2005-217822 A | 8/2005 |
| JP | 2003-099720 A | 4/2003 | | JP | 2005-229474 A | 8/2005 |
| JP | 2003-099721 A | 4/2003 | | JP | 2005-236339 A | 9/2005 |
| JP | 2003-110344 A | 4/2003 | | JP | 2005-244778 A | 9/2005 |
| JP | 2003-132330 A | 5/2003 | | JP | 2005-252853 A | 9/2005 |
| JP | 2003-134007 A | 5/2003 | | JP | 2005-275870 A | 10/2005 |
| JP | 2003-155062 A | 5/2003 | | JP | 2005-284352 A | 10/2005 |
| JP | 2003-158414 A | 5/2003 | | JP | 2005-284455 A | 10/2005 |
| JP | 2003-168760 A | 6/2003 | | JP | 2005-293537 A | 10/2005 |
| JP | 2003-179565 A | 6/2003 | | JP | 2005-295135 A | 10/2005 |
| JP | 2003-187207 A | 7/2003 | | JP | 2005-311205 A | 11/2005 |
| JP | 2003-187211 A | 7/2003 | | JP | 2005-321305 A | 11/2005 |
| JP | 2003-188338 A | 7/2003 | | JP | 2005-322119 A | 11/2005 |
| JP | 2003-188620 A | 7/2003 | | JP | 2005-335755 A | 12/2005 |
| JP | 2003-198230 A | 7/2003 | | JP | 2005-340759 A | 12/2005 |
| JP | 2003-209421 A | 7/2003 | | JP | 2005-345802 A | 12/2005 |
| JP | 2003-216919 A | 7/2003 | | JP | 2005-346820 A | 12/2005 |
| JP | 2003-218624 A | 7/2003 | | JP | 2005-352858 A | 12/2005 |
| JP | 2003-233780 A | 8/2003 | | JP | 2006-13976 A | 1/2006 |
| JP | 2003-242471 A | 8/2003 | | JP | 2006-013976 A | 1/2006 |
| JP | 2003-243918 A | 8/2003 | | JP | 2006-025390 A | 1/2006 |
| JP | 2003-249813 A | 9/2003 | | JP | 2006-031766 A | 2/2006 |
| JP | 2003-529163 A | 9/2003 | | JP | 2006-033312 A | 2/2006 |
| JP | 2003-288560 A | 10/2003 | | JP | 2006-39902 A | 2/2006 |
| JP | 2003-309418 A | 10/2003 | | JP | 2006-039947 A | 2/2006 |
| JP | 2003-317060 A | 11/2003 | | JP | 2006-42059 A | 2/2006 |
| JP | 2003-331246 A | 11/2003 | | JP | 2006-42097 A | 2/2006 |
| JP | 2003-332820 A | 11/2003 | | JP | 2006-053833 A | 2/2006 |
| JP | 2003-536302 A | 12/2003 | | JP | 2006-67479 A | 3/2006 |
| JP | 2004-040597 A | 2/2004 | | JP | 2006-72706 A | 3/2006 |
| JP | 2004-505481 A | 2/2004 | | JP | 2006-074348 A | 3/2006 |
| JP | 2004-082775 A | 3/2004 | | JP | 2006-80367 A | 3/2006 |
| JP | 2004-88218 A | 3/2004 | | JP | 2006-92630 A | 4/2006 |
| JP | 2004-93693 A | 3/2004 | | JP | 2006-102953 A | 4/2006 |
| JP | 2004-096566 A | 3/2004 | | JP | 2006-107296 A | 4/2006 |
| JP | 2004-096618 A | 3/2004 | | JP | 2006-513594 A | 4/2006 |
| JP | 2004-126750 A | 4/2004 | | JP | 2006-148462 A | 6/2006 |
| JP | 2004-127230 A | 4/2004 | | JP | 2006-148518 A | 6/2006 |
| JP | 2004-140513 A | 5/2004 | | JP | 2006-151402 A | 6/2006 |
| JP | 2004-163134 A | 6/2004 | | JP | 2006-174151 A | 6/2006 |
| JP | 2004-213582 A | 7/2004 | | JP | 2006-195795 A | 7/2006 |
| JP | 2004-519916 A | 7/2004 | | JP | 2006-203187 A | 8/2006 |
| JP | 2004-234595 A | 8/2004 | | JP | 2006-203852 A | 8/2006 |
| JP | 2004-253858 A | 9/2004 | | JP | 2006-217000 A | 8/2006 |
| JP | 2004-527864 A | 9/2004 | | JP | 2006-232292 A | 9/2006 |
| JP | 2004-280390 A | 10/2004 | | JP | 2006-237674 A | 9/2006 |
| JP | 2004-282403 A | 10/2004 | | JP | 2006-246372 A | 9/2006 |
| JP | 2004-287767 A | 10/2004 | | JP | 2006-270212 A | 10/2006 |
| JP | 2004-295297 A | 10/2004 | | JP | 2006-270681 A | 10/2006 |
| JP | 2004-297249 A | 10/2004 | | JP | 2006-270766 A | 10/2006 |
| JP | 2004-297681 A | 10/2004 | | JP | 2006-285911 A | 10/2006 |
| JP | 2004-304370 A | 10/2004 | | JP | 2006-287659 A | 10/2006 |
| JP | 2004-319848 A | 11/2004 | | JP | 2006-295879 A | 10/2006 |
| JP | 2004-326380 A | 11/2004 | | JP | 2006-302219 A | 11/2006 |
| JP | 2004-334268 A | 11/2004 | | JP | 2006-309401 A | 11/2006 |
| JP | 2004-336250 A | 11/2004 | | JP | 2006-311239 A | 11/2006 |
| JP | 2004-343000 A | 12/2004 | | JP | 2006-323481 A | 11/2006 |
| JP | 2004-362190 A | 12/2004 | | JP | 2006-339964 A | 12/2006 |
| JP | 2004-362341 A | 12/2004 | | JP | 2007-007888 A | 1/2007 |
| JP | 2004-362602 A | 12/2004 | | JP | 2007-13120 A | 1/2007 |
| JP | 2005-5866 A | 1/2005 | | JP | 2007-18067 A | 1/2007 |

| | | | |
|---|---|---|---|
| JP | 2007-019905 A | 1/2007 | |
| JP | 2007-28002 A | 2/2007 | |
| JP | 2007-040702 A | 2/2007 | |
| JP | 2007-043535 A | 2/2007 | |
| JP | 2007-048126 A | 2/2007 | |
| JP | 2007-65822 A | 3/2007 | |
| JP | 2007-79687 A | 3/2007 | |
| JP | 2007-81712 A | 3/2007 | |
| JP | 2007-096768 A | 4/2007 | |
| JP | 2007-102348 A | 4/2007 | |
| JP | 2007-116347 A | 5/2007 | |
| JP | 2007-122542 A | 5/2007 | |
| JP | 2007-150642 A | 6/2007 | |
| JP | 2007-150868 A | 6/2007 | |
| JP | 2007-159083 A | 6/2007 | |
| JP | 2007-159129 A | 6/2007 | |
| JP | 2007-166133 A | 6/2007 | |
| JP | 2007-172369 A | 7/2007 | |
| JP | 2007-172527 A | 7/2007 | |
| JP | 2007-228325 A | 9/2007 | |
| JP | 2007-233597 A | 9/2007 | |
| JP | 2007-266999 A | 10/2007 | |
| JP | 2007-272264 A | 10/2007 | |
| JP | 2007-287128 A | 11/2007 | |
| JP | 2007-295557 A | 11/2007 | |
| JP | 2007-312350 A | 11/2007 | |
| JP | 2007-324865 A | 12/2007 | |
| JP | 2008-033716 A | 2/2008 | |
| JP | 2008-042910 A | 2/2008 | |
| JP | 2008-72243 A | 3/2008 | |
| JP | 2008-083867 A | 4/2008 | |
| JP | 2008-097426 A | 4/2008 | |
| JP | 4069958 B2 | 4/2008 | |
| JP | 2008-103691 A | 5/2008 | |
| JP | 2008-107947 A | 5/2008 | |
| JP | 2008-513888 A | 5/2008 | |
| JP | 2008-148345 A | 6/2008 | |
| JP | 2008-519347 A | 6/2008 | |
| JP | 2008-160874 A | 7/2008 | |
| JP | 2008-167190 A | 7/2008 | |
| JP | 2008-197714 A | 8/2008 | |
| JP | 2008-535372 A | 8/2008 | |
| JP | 2008-207875 A | 9/2008 | |
| JP | 2008-217406 A | 9/2008 | |
| JP | 2008-288915 A | 11/2008 | |
| JP | 2009-017284 A | 1/2009 | |
| JP | 2009-25870 A | 2/2009 | |
| JP | 2009-27291 A | 2/2009 | |
| JP | 2009-044715 A | 2/2009 | |
| JP | 3148168 U | 2/2009 | |
| JP | 2009-110144 A | 5/2009 | |
| JP | 2009-153166 A | 7/2009 | |
| JP | 2009-182630 A | 8/2009 | |
| JP | 2010-009196 A | 1/2010 | |
| JP | 2010-081571 | 4/2010 | |
| JP | 4609604 B2 | 1/2011 | |
| NL | 9100176 A | 3/1992 | |
| NL | 9100347 A | 3/1992 | |
| WO | 98/33142 A1 | 7/1998 | |
| WO | 99/67754 A1 | 12/1999 | |
| WO | 00/10122 A2 | 2/2000 | |
| WO | 01/95242 A2 | 12/2001 | |
| WO | 02/48980 A1 | 6/2002 | |
| WO | 02/061675 A1 | 8/2002 | |
| WO | 02/097723 A1 | 12/2002 | |
| WO | 03/079305 A1 | 9/2003 | |
| WO | 2004/036772 A2 | 4/2004 | |
| WO | 2004/070879 A | 8/2004 | |
| WO | 2004/072892 A2 | 8/2004 | |
| WO | 2005/073937 A | 8/2005 | |
| WO | 2005/091434 A1 | 9/2005 | |
| WO | 2005/115849 A1 | 12/2005 | |
| WO | 2006/045682 A | 5/2006 | |
| WO | 2006/048663 A1 | 5/2006 | |
| WO | 2006/114821 A1 | 11/2006 | |
| WO | 2007/083574 A1 | 7/2007 | |
| WO | 2007/083575 A1 | 7/2007 | |
| WO | 2007/086130 A1 | 8/2007 | |
| WO | 2007/094494 A1 | 8/2007 | |
| WO | 2007/097385 A1 | 8/2007 | |
| WO | 2007/102360 A1 | 9/2007 | |
| WO | 2007/105348 A1 | 9/2007 | |
| WO | 2007/119310 A1 | 10/2007 | |
| WO | 2007/125683 A1 | 11/2007 | |
| WO | 2007/138857 A1 | 12/2007 | |
| WO | 2008/007606 A | 1/2008 | |
| WO | 2008/081699 A1 | 7/2008 | |
| WO | 2008/126458 A1 | 10/2008 | |
| WO | 2008/133018 A1 | 11/2008 | |
| WO | 2008/140037 A1 | 11/2008 | |
| WO | 2008/142957 A1 | 11/2008 | |
| WO | 2009/011144 A1 | 1/2009 | |
| WO | 2009/011376 A1 | 1/2009 | |
| WO | 2009/011400 A1 | 1/2009 | |
| WO | 2009/011423 A1 | 1/2009 | |
| WO | 2009/081719 A1 | 7/2009 | |
| WO | 2009/110381 A1 | 9/2009 | |
| WO | 2009/128437 A1 | 10/2009 | |

OTHER PUBLICATIONS

Kato: "Radio IC Device"; U.S. Appl. No. 13/080,775, filed on Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official communication issued in counterpart International Application No. PCT/JP2008/071502, mailed Feb. 24, 2009.

Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed Feb. 15, 2011.
Ito: "Wireless IC Device and Method of Detecting Environmental State Using the Device"; U.S. Appl. No. 13/421,889, filed Mar. 16, 2012.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.

Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454; filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Application No. PCT/JP2007/066007, mailed on Nov. 27, 2007.

Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/057668, mailed on Aug. 17, 2010.
Dokai et al.: "Optical Disc"; U.S. Appl. No. 13/295,153, filed Nov. 14, 2011.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna,"; U.S. Appl. No. 12/845,846, filed Jul. 29, 2010.
Official Communication issued in International Patent Application No. PCT/JP20091053690, mailed on Jun. 2, 2009.
Kato et al.: "Radio Frequency IC Device and Radio Communication System,"; U.S. Appl. No. 12/859,340, filed Aug. 19, 2010.
Official Communication issued in International Patent Application No. PCT/JP20091055758, mailed on Jun. 23, 2009.
Kato et al.: "Wireless IC Device,"; U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device,"; U.S. Appl. No. 12/861,945, filed Aug. 24, 2010.
Kato: "Wireless IC Device and Electromagnetic Coupling Module,"; U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device"; U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.

\* cited by examiner

ANTENNA DEVICE AND MOBILE COMMUNICATION TERMINAL

BACKGROUND OF THE INVENTION

1. Field of the Invention

The present invention relates to an antenna device and a mobile communication terminal, and in particular, to an antenna device for use in a radio frequency identification (RFID) system or the like and a mobile communication terminal that includes the antenna device.

2. Description of the Related Art

In recent years, an RFID system, in which predetermined information and electric power are transmitted and received by non-contact communication using an electromagnetic field between a reader-writer for generating an induction field and a wireless IC device that is attached to an object and that stores the predetermined information, such as an IC tag, has been developed as a management system for objects and information.

For example, Japanese Unexamined Patent Application Publication No. 2003-37861 discloses a cellular phone in which a non-contact IC card is embedded. However, a mobile communication terminal, such as a cellular phone, is small and multifunctional, so various metallic components are disposed in a small casing with high density. For example, a ground conductor and other elements are arranged on a plurality of layers on a printed wiring board that is to be a mother board, and components containing metal, such as IC chips and capacitors, are mounted on the surface of the printed wiring board with high density. In the casing, a battery pack that is to be a power source is also arranged, and the battery pack contains a metallic component, such as a frame.

Accordingly, there is an issue in that the communication performance of an antenna device disposed in a casing, such as an IC card, is affected by a metallic component in the casing. To ensure predetermined communication performance, it is necessary to increase the size of an antenna or reconsider the shape of the casing or the layout of the metallic component. However, such an approach is limited under the present circumstances.

SUMMARY OF THE INVENTION

In light of the above circumstances, preferred embodiments of the present invention provide an antenna device and mobile communication terminal with an improved gain to transmit and receive signals and with satisfactory communication performance.

An antenna device according to a first preferred embodiment of the present invention includes a feeding member that includes a coil pattern, and an emitting member arranged to emit a transmit signal supplied from the feeding member and/or to receive a receive signal and supply the receive signal to the feeding member.

The emitting member includes an opening portion provided in a portion thereof and a slit portion communicating with the opening portion. When seen in plan view from a direction of a winding axis of the coil pattern, the opening portion of the emitting member and an inner region of the coil pattern overlap each other at least partially and the emitting member and the coil pattern overlap each other at least partially.

A mobile communication terminal according to a second preferred embodiment of the present invention includes a feeding member including a coil pattern, an emitting member arranged to emit a transmit signal supplied from the feeding member and/or to receive a receive signal and supply the receive signal to the feeding member, and a casing in which the feeding member and the emitting member are incorporated.

The emitting member includes an opening portion provided in a portion thereof and a slit portion communicating with the opening portion. When seen in plan view from a direction of a winding axis of the coil pattern, the opening portion of the emitting member and an inner region of the coil pattern overlap each other at least partially and the emitting member and the coil pattern overlap each other at least partially.

The emitting member includes the opening portion provided in the portion thereof and the slit portion communicating with the opening portion, and, when seen in plan view from the direction of the winding axis of the coil pattern, the opening portion of the emitting member and the inner region of the coil pattern overlap each other at least partially and the emitting member and the coil pattern overlap each other at least partially. Therefore, when a current passes through the coil pattern, an excited magnetic field passes through the opening portion of the emitting member and is ideally distributed, and the induction field excites an inductive current in the vicinity of the opening portion of the emitting member. This can improve the gain of transmit and receive signals and increase the communication distance.

According to various preferred embodiments of the present invention, the gain of transmit and receive signals can be improved, and satisfactory communication performance is achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A and 1B illustrate a mobile communication terminal on which an antenna device according to a first preferred embodiment of the present invention, is mounted, wherein FIG. 1A illustrates a back side of a casing, and FIG. 1B is a cross-sectional view taken along the line A-A.

FIGS. 6A and 6B illustrate a state of magnetic coupling between the antenna device and a reader-writer-side antenna, wherein FIG. 6A illustrates the first preferred embodiment, and FIG. 6B illustrates a comparative example.

FIGS. 8A and 8B illustrate an antenna device according to a second preferred embodiment of the present invention, wherein FIG. 8A is an exploded perspective view, and FIG. 8B is a cross-sectional view.

FIGS. 10A and 10B schematically illustrate a mobile communication terminal on which an antenna device according to a third preferred embodiment of the present invention, wherein FIG. 10A is a plan view, and FIG. 10B is a side view.

FIG. 11A is a plan view, and FIG. 11B is a side view.

FIGS. 12A and 12B schematically illustrate a mobile communication terminal on which an antenna device according to a fifth preferred embodiment of the present invention, is mounted, wherein FIG. 12A is a plan view, and FIG. 12B is a side view.

FIGS. 13A and 13B schematically illustrate a mobile communication terminal on which an antenna device according to a sixth preferred embodiment of the present invention, is mounted, wherein FIG. 13A is a plan view, and FIG. 13B is a side view.

FIGS. 14A and 14B illustrate an antenna device according to a seventh preferred embodiment of the present invention, wherein FIG. 14A is an exploded perspective view, and FIG. 14B is a plan view.

FIGS. 15A and 15B illustrate an antenna device according to an eighth preferred embodiment of the present invention, wherein FIG. 15A is an exploded perspective view, and FIG. 15B is a plan view.

DETAILED DESCRIPTION OF THE PREFERRED EMBODIMENTS

Figure 1A:
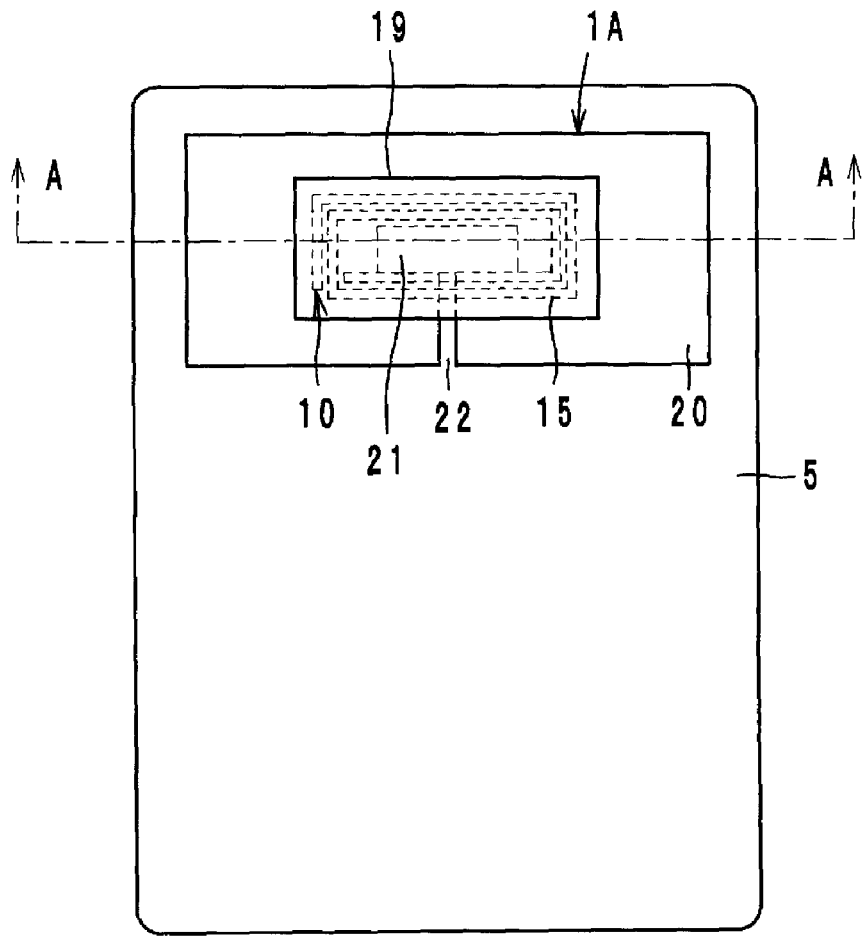

An antenna device and a mobile communication terminal according to the present invention are described below with respect to specific preferred embodiments. In the drawings, the same reference numerals are used for common components and portions, and redundant description is not repeated.

First Preferred Embodiment

Figure 1B:
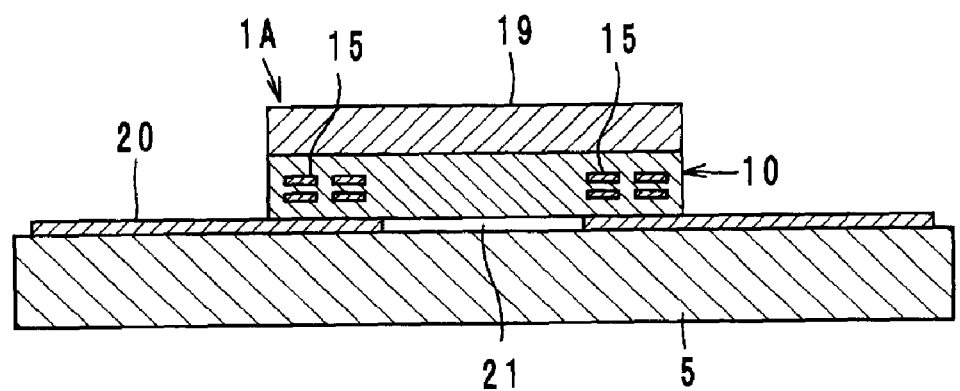

An antenna device 1A, which is a first preferred embodiment, includes a feeding member 10 on the back side of a casing 5 of a mobile communication terminal (e.g., a cellular phone), a magnetic member 19 made of a ferrite sheet attached to the feeding member 10, and an emitting member 20, the feeding member 10 containing a coil pattern 15, as illustrated in FIGS. 1A and 1B.

The emitting member 20 defines an antenna to emit a signal supplied from the feeding member 10 and to receive a receive signal and supply it to the feeding member 10. The emitting member 20 is provided on the back side of the casing 5 and includes a metallic film or foil. The feeding member 10 includes a stack in which a plurality of dielectric layers (preferably made of thermoplastic resin sheets, for example) are stacked on each other. The coil pattern 15 is a coil in which a plurality of ring-shaped conductors arranged on the plurality of dielectric layers are helically connected to each other with an interlayer conductor (not illustrated in FIG. 1B), such as a via-hole conductor, and the winding axis of the coil pattern extends in the stacking direction of the stack. The opposite end portions of the coil pattern 15 are connected to a wireless circuit of an IC tag or the like incorporated in the casing 5.

The emitting member 20 includes an opening portion 21 located in a portion thereof and a slit portion 22 in communication with the edge portion of the opening portion 21. The slit portion 22 includes a first end communicating with the opening portion 21 and a second end opening at the side edge of the emitting member 20. That is, the slit portion 22 is disposed such that the opening portion 21 and the side edge of the emitting member 20 communicate with each other. When seen in plan view from the direction of the winding axis of the coil pattern 15, the whole region of the opening portion 21 preferably overlaps the inner region of the coil pattern 15 and the coil pattern 15 overlaps the emitting member 20, for example.

Figure 2:
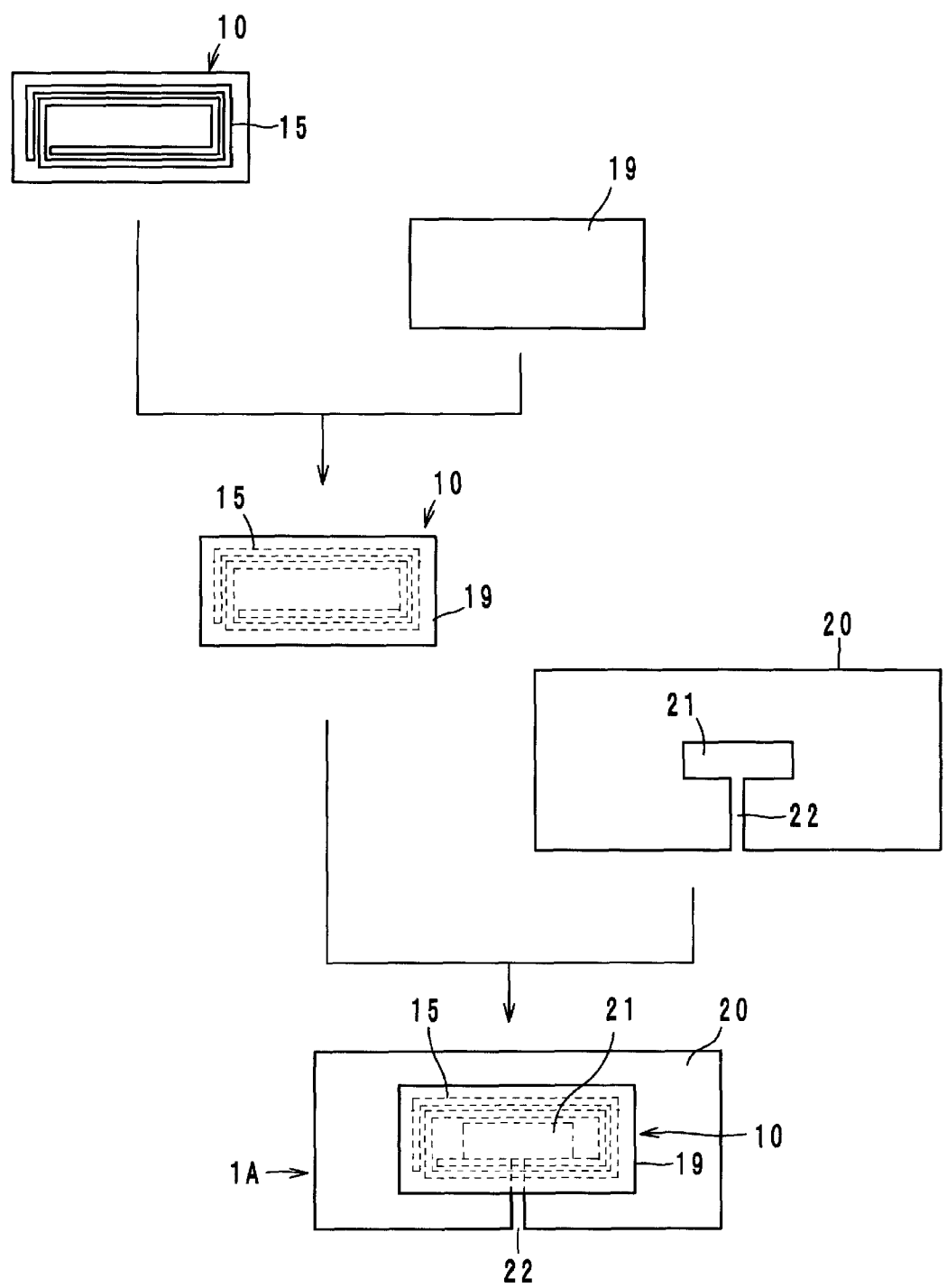
FIG. 2 illustrates how the antenna device according to the first preferred embodiment, is assembled in an exploded manner.

A process of assembling the antenna device 1A is illustrated in FIG. 2. First, the magnetic member 19 is attached to the feeding member 10 in which the coil pattern 15 is incorporated, and the feeding member 10 is attached to the emitting member 20.

In the antenna device 1A having the above-described configuration, by the feeding member 10 which includes the coil pattern 15, a transmit signal from a wireless circuit electrically connected to the opposite ends of the coil pattern 15 is supplied to the emitting member 20. And a receive signal (received power) from the emitting member 20 is supplied to the wireless circuit through the feeding member 10. This operation is described in detail below.

Figure 3:
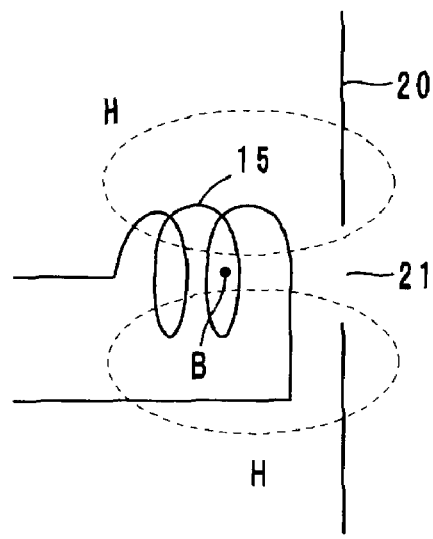
FIG. 3 illustrates coupling between a coil pattern and an emitting member in the antenna device according to the first preferred embodiment of the present invention.

As previously described, when seen in plan view from the direction of the winding axis of the coil pattern 15 in the feeding member 10, the opening portion 21 of the emitting member and the inner region of the coil pattern 15 overlap each other. Thus, as illustrated in FIG. 3, for example, in transmission of a radio signal, a signal current from the wireless circuit passes through the coil pattern 15, induction fields H are caused by that current, and the induction fields H are ideally distributed through the opening portion 21, as indicated by the dotted lines in FIG. 3. The state where the induction fields H is ideally distributed indicates that the center B of the two magnetic fields H coincides with the center of the opening portion 21. In that state, the gain of the emitting member 20 is maximum.

Figure 4:
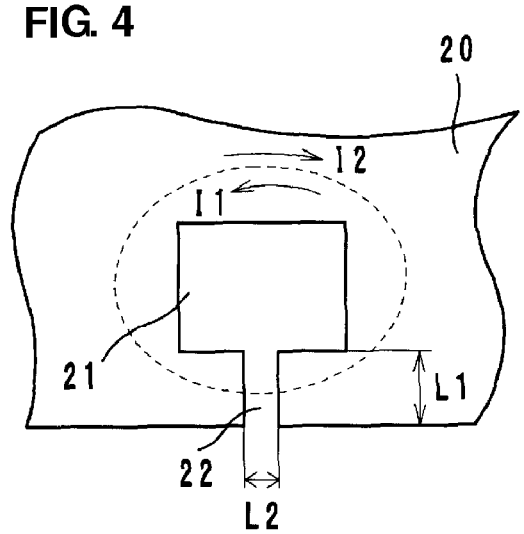
FIG. 4 illustrates an inductive current occurring in the vicinity of an opening portion of the emitting member in the antenna device according to the first preferred embodiment.
Figure 5:
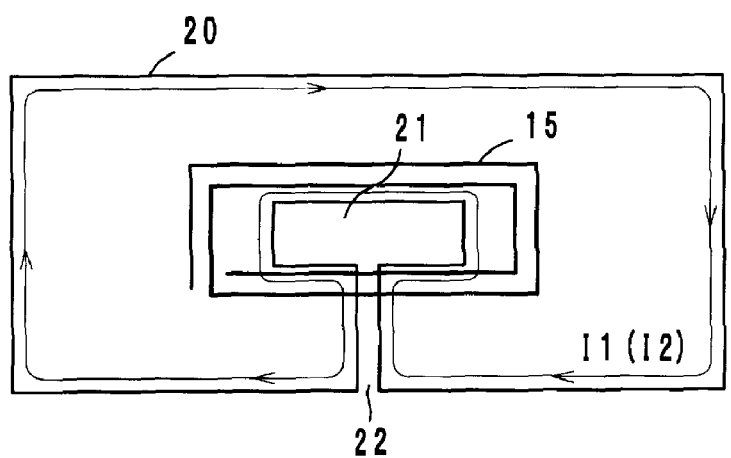
FIG. 5 illustrates an inductive current passing through an outer edge portion of the emitting member in the antenna device according to the first preferred embodiment.

As illustrated in FIG. 4, inductive currents I1 and I2 (whose propagation directions are different from each other by 180°) are generated by the induction fields H in the vicinity of the opening portion 21. Specifically, as illustrated in FIG. 5, the inductive currents I1 and I2 pass in the vicinity of each of the opening portion 21 and the slit portion 22 and flow in the outer edge portion of the emitting member 20 by the effects of the plane and edge of the emitting member 20. Although being not illustrated in FIG. 5, the current I2 passes in a direction opposite to the current I1. Because the emitting member 20 and the coil pattern 15 overlap each other in plan view, the inductive currents I1 and I2 pass in a direction opposite to the current passing through the coil pattern 15 in such a way that they block the induction field arising from the coil pattern 15.

Figure 6A:
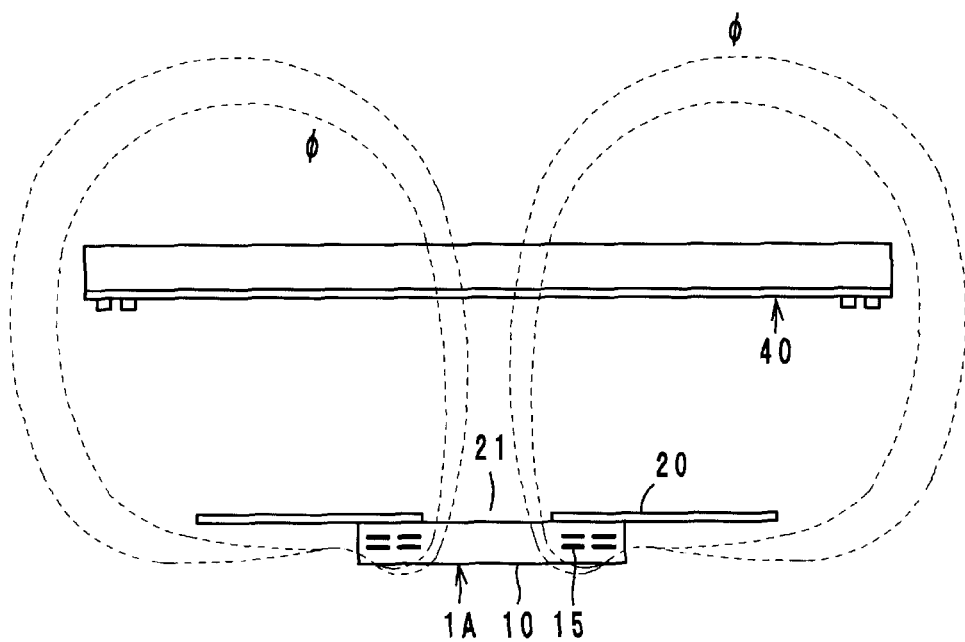

Here, the inductive currents I1 and I2 cause a magnetic field to arise from the emitting member 20, and the inductive currents I1 and I2 pass throughout the emitting member 20. In particular, when a radio signal used in the antenna device 1A is in the HF range, as illustrated in FIG. 6A, because no magnetic flux passes through the emitting member 20, a magnetic flux φ extends along a relatively large loop in a path whose inside is the opening portion 21 of the emitting member 20 and outside is the outer edge of the emitting member 20. This enables an increased communication distance to a reader-writer antenna 40.

Figure 6B:
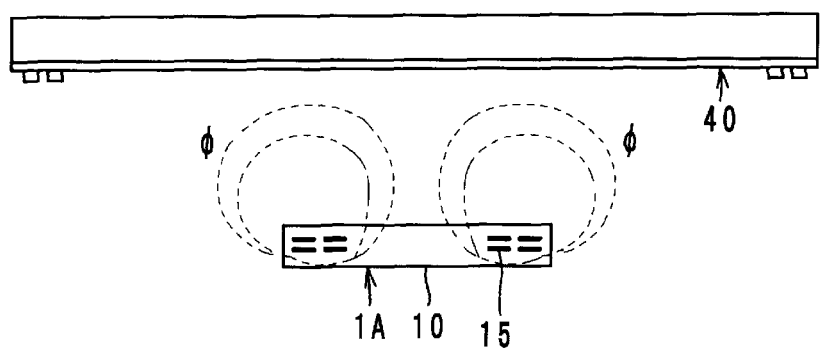

The state of the magnetic coupling between the antenna device 1A and the reader-writer antenna 40 is illustrated in FIG. 6A. A case where the emitting member 20 is omitted is illustrated in FIG. 6B as a comparative example. In this comparative example, because of the absence of the emitting member 20, the magnetic flux φ does not spread, and the amount of the coupling to the antenna 40 is small. Accordingly, a phenomenon in which the proximity of both of the antennas destabilizes their communication occurs.

Here, results of measurement of a distance at which communication with the reader-writer antenna 40 can be made with respect to various sizes (length and width sizes) of the feeding member 10 are provided below. The numerals inside the parentheses indicate the distances at which communication can be made in the comparative example, in which the emitting member 20 is omitted.

For 22.5 mm×20 mm, 0 to 44 mm (0 to 24 mm)
For 22.5 mm×19 mm, 0 to 43 mm (0 to 23 mm)
For 22.5 mm×18 mm, 0 to 41 mm (0 to 19 mm)
For 22.5 mm×17 mm, 0 to 39 mm (–)
For 22.5 mm×16 mm, 0 to 38 mm (–)

Figure 7:
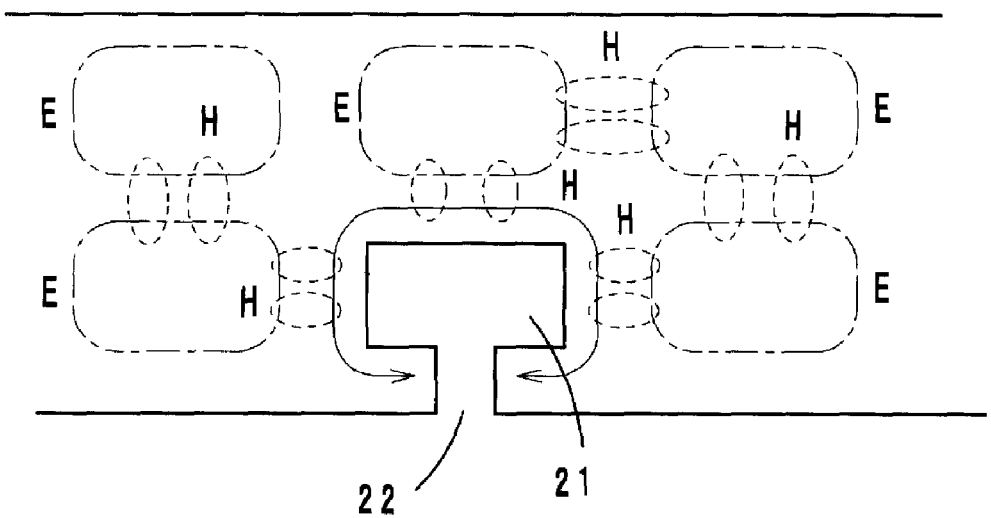
FIG. 7 illustrates how the antenna device according to the first preferred embodiment, operates when a radio signal is in the UHF range.

As described above, in the emitting member 20, the magnetic fields H are induced by the inductive currents I1 and I2; when a radio signal used in the antenna device 1A is in a high-frequency range, in particular, in the UHF range, as illustrated in FIG. 7, the magnetic fields H induces electric fields E, the electric fields E induce the magnetic fields H, and this linkage causes the electromagnetic-field distribution to two-dimensionally spread throughout the emitting member 20. This electromagnetic-field distribution leads to transmission of a radio signal, and the passage of the inductive currents I1 and I2 throughout the emitting member 20 enables an increased communication distance.

Because the opening portion 21 communicates with the slit portion 22, the flows of the inductive currents I1 and I2 are restricted by the slit portion 22, and a potential difference is provided (capacitance is generated). Accordingly, controlling the quantity or distribution of the inductive currents I1 and I2 using the length L1 or width L2 of the slit portion 22 enables controlling the amount of an electric field and a magnetic field occurring throughout the emitting member 20. As a result, the gain of a transmit signal can be controlled.

As previously described, the gain of a radio signal transmitted or received by the emitting member 20 can be controlled using the length L1 and width L2 of the slit portion 22. Specifically, the gain tends to increase with an increase in the length L1 of the slit portion 22 and a reduction in the width L2.

As illustrated in FIG. 1B, the ring-shaped conductor on each of the dielectric layers of the feeding member 10 may preferably be made up of parallel line conductors spaced at a predetermined interval. That is, in the first preferred embodiment, the ring-shaped conductor preferably includes two parallel line conductors. A magnetic flux passes through the gap between the two line conductors, and the excited magnetic fields spread along the direction of the center of the coil pattern 15, that is, the direction perpendicular or substantially perpendicular to the winding axis, so the magnetic flux can be efficiently used. An increased number of parallel conductors in the ring-shaped conductor can provide the advantageous effect of reducing a direct-current resistance of the ring-shaped conductor. As a result, the gain of a radio signal can be improved.

The equivalent circuit in FIG. 3 illustrates only the coil pattern 15 as the feeding circuit. The inductance of the coil pattern 15 itself is used as the inductance component. In addition, because the coil pattern 15 includes the stacked ring-shaped electrodes, as previously described, stray capacitances generated between the ring-shaped electrodes on the layers are used as the capacitance component. The feeding member 10 includes at least one coil pattern 15. When the feeding circuit has a predetermined resonant frequency, a capacitance component or an inductance component to adjust that resonance frequency may be further included.

In the first preferred embodiment, the feeding circuit (coil pattern 15) has a predetermined resonant frequency, and the frequency of a radio signal transmitted or received by the emitting member 20 may preferably substantially correspond to that resonant frequency. Here, "substantially correspond to" indicates that the range of the resonant frequency of the feeding circuit substantially coincides with the frequency range of a radio signal transmitted or received by the emitting member 20. Because the frequency of a transmit signal and/or a receive signal substantially corresponds to the resonant frequency of the feeding circuit, the antenna device having a stable frequency characteristic that does not substantially depend on the shape or material of the emitting member 20 or the shape or material of the casing 5, which bears the emitting member 20, is obtainable.

In other words, the frequency range of a radio signal is specified by the shape or material of the opening portion 21 or the slit portion 22 of the emitting member 20, or alternatively, the shape or material of the coil pattern 15 in the feeding member 10, and the impedance matching between the emitting member 20 and a wireless circuit (signal processing unit) is also achieved. Accordingly, the antenna device supporting various types of mobile communication terminals can be achieved without having to change the shape of the opening portion 21 or the slit portion 22 of the emitting member 20 or the shape of the coil pattern.

The magnetic member 19, which is stacked on the feeding member 10, has the function of causing a magnetic field occurring in the coil pattern 15 to efficiently couple to the emitting member without allowing it to leak to the outside and of blocking a magnetic field occurring in the outside and preventing degradation in communication performance.

In the first preferred embodiment, because the feeding member 10 and the emitting member 20 are electromagnetically coupled to each other, the impedance matching between the feeding member 10 and the emitting member 20 may not necessarily be considered. That is, with the first preferred embodiment, as previously described, appropriately designing the shape of the slit portion 22 can enable the gain of a radio signal to be very easily controlled.

It may be preferable that the opening portion 21 of the emitting member 20 and the inner region of the coil pattern 15 substantially entirely overlap each other and that the area of the opening portion 21 be substantially the same as the area of the inner region of the coil pattern 15. This is because, in that case, the magnetic fields H (see FIG. 3) caused by the coil pattern 15 efficiently propagate in the emitting member 20, the loss is suppressed, and the gain is improved. Substantially entirely overlapping between the opening portion 21 and the inner region of the coil pattern 15 enables the entire coil pattern 15 to overlap the emitting member 20. This enables a large inductive current to occur in the emitting member 20, and therefore, the communication distance can be further increased. However, the opening portion 21 and the inner region of the coil pattern 15 may overlap each other at least partially, and the emitting member 20 and the coil pattern 15 may overlap each other partially.

It may be preferable that the area of the emitting member 20 be larger than the area of the portion where the coil pattern 15 is formed. The area of the emitting member 20 being larger than the area of the portion where the coil pattern 15 is located enables the inductive current to pass along a large loop, and therefore, the communication distance can be further increased.

It is useful in terms of workability that the slit portion 22 has a line shape, as described in the first preferred embodiment; however, it may be meandering or warped, for example.

The feeding member 10 may be the one in which the coil pattern 15 is provided on a single substrate.

Second Preferred Embodiment

Figure 8A:
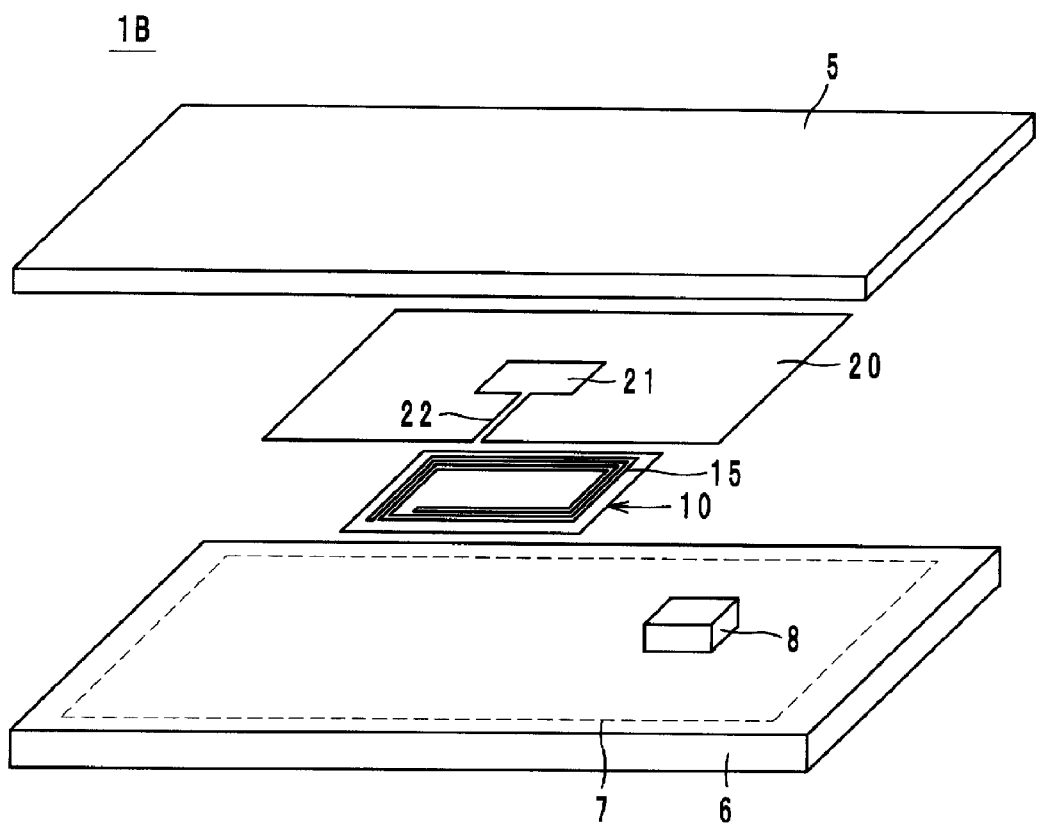
Figure 8B:
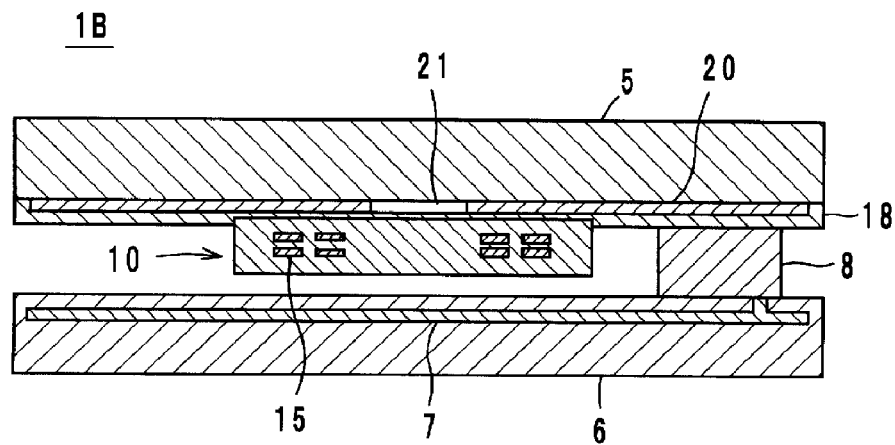

An antenna device 1B, which is a second preferred embodiment, preferably has basically the same configuration as that of the antenna device 1A, which is the first preferred embodiment, and differs in that a conductor member (hereinafter referred to as ground conductor 7) disposed on a printed wiring board 6 mounted on a mobile communication terminal and the emitting member 20 are coupled to each other through a capacitance C (see FIG. 9), as illustrated in FIGS. 8A and 8B. More specifically, the ground conductor 7 and the emitting member 20 are opposed to each other, a dielectric layer 18, which is an adhesive, is positioned between the emitting member and a conductive member (capacitance assisting element) 8 electrically connected to the ground conductor 7. Thus, the capacitance C is generated between the conductive member 8 and the emitting member 20.

The operational advantage of the antenna device 1B, which is the second preferred embodiment, is basically the same as that of the antenna device 1A, which is the above-described first preferred embodiment. From the viewpoint of the coupling between the emitting member 20 and the ground conductor 7 by the use of the capacitance C, the operational advantage described below can also be provided.

Figure 9:
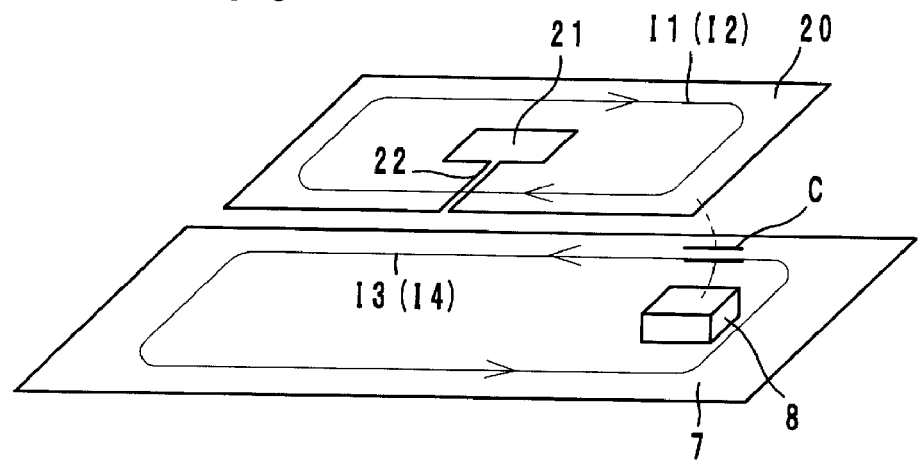
FIG. 9 is a simplified illustration of how the antenna device according to the second preferred embodiment operates.

That is, in communication, an induction field resulting from a signal current passing through the coil pattern 15 causes the inductive currents I1 and I2 to pass through the emitting member 20, as illustrated in FIG. 9. FIG. 9 is an illustration that is simpler than FIG. 5, which is referred to in the first preferred embodiment. Eddy currents I3 and I4 resulting from the inductive currents I1 and I2 occur in the ground conductor 7, which is opposed to the emitting member 20, in directions in which the magnetic fields caused by the inductive currents are cancelled. The eddy currents I3 and I4 originally dissipate as heat, but the energy of the eddy currents I3 and I4 is returned to the emitting member 20 by the capacitance C. As a result, the gain of the emitting member 20 can be improved, and the communication distance can be increased. Because the magnetic fields excited by the coil pattern 15 are absorbed in the emitting member 20 or the ground conductor 7, the necessity to consider the arrangement relationship with other metallic components disposed in the casing 5 is reduced.

As described above, for the second preferred embodiment, the combined inductance of the emitting member 20 and the ground conductor 7 and the capacitance C define a parallel resonant circuit. The resonance point of that parallel resonant circuit is preferably higher than the frequency of a signal transmitted or received by the emitting member 20. That is, if the used frequency is lower than the resonant frequency of the parallel resonant circuit, the parallel resonant circuit is based on magnetic field emission (inductive); if the used frequency is higher than the resonant frequency of the parallel resonant circuit, the parallel resonant circuit is based on electric field emission (capacitive). Accordingly, to use magnetic field emission in communication, it is preferable that the resonance point of the parallel resonant circuit be higher than the used frequency (frequency of a signal transmitted or received by the emitting member 20).

In the second preferred embodiment, the conductor member being capacitive-coupled to the emitting member 20 may be a component other than the ground conductor 7 as long as it is a conductor member disposed on the printed circuit board 6. Any form of capacitive-coupling between the conductor member and the emitting member 20 may be used; for example, a metal frame disposed in the casing 5 as the conductive member 8 may be used. The conductive member (capacitance assisting element) 8 may preferably be adjacent to the slit portion 22. When the capacitance assisting element and the slit portion 22 are adjacent to each other, the inductance component of the slit portion 22 and the portion between the emitting member 20 and the ground conductor 7, the portion containing the capacitance assisting element, define a single LC parallel resonant circuit. When the resonant frequency of this LC parallel resonant circuit is set at a value higher than the used frequency, magnetic field emission starting from the slit portion 22 occurs. At this time, the current of the parallel resonant circuit also passes through the ground conductor 7. Therefore, the ground conductor 7 can be used as a part of the emitting portion, and the magnetic field emission can arise from the large ground conductor 7.

Third Through Sixth Preferred Embodiments

Next, antenna devices 1C to 1F, which are third to sixth preferred embodiments, respectively, are described. Each of the antenna devices 1C to 1F has predetermined directivity obtained by variously changing the direction of the slit portion of the emitting member 20 or the positional relationship between the ground conductor 7 on the printed circuit board and the emitting member 20.

Figure 10A:
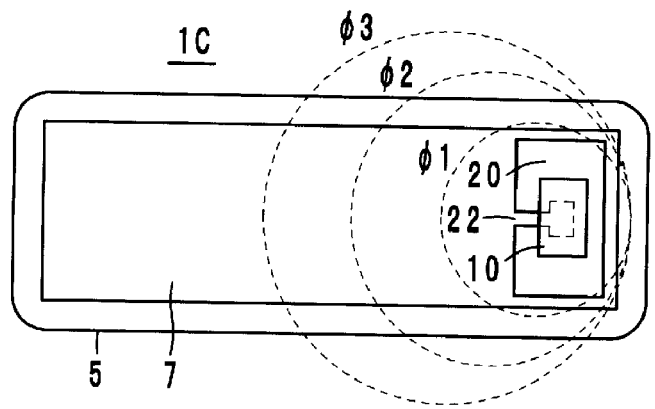
Figure 10B:
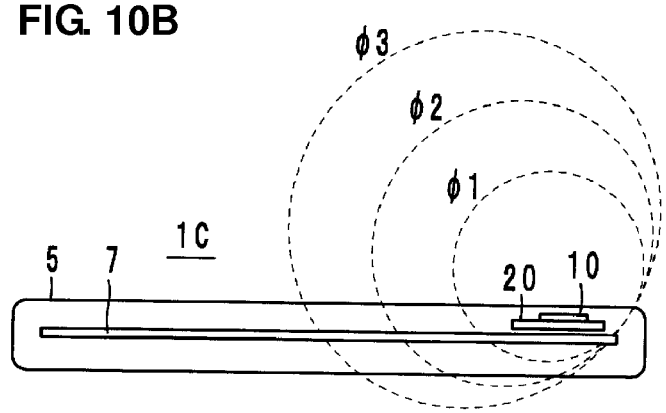

The antenna device 1C is the one in which the emitting member 20 overlaps a first end of the ground conductor 7 and the slit portion 22 faces the internal portion of the terminal casing 5, as illustrated in FIG. 10. The magnetic flux $\phi 1$, $\phi 2$, and $\phi 3$ indicates the directivity of the magnetic fields.

Figure 11A:
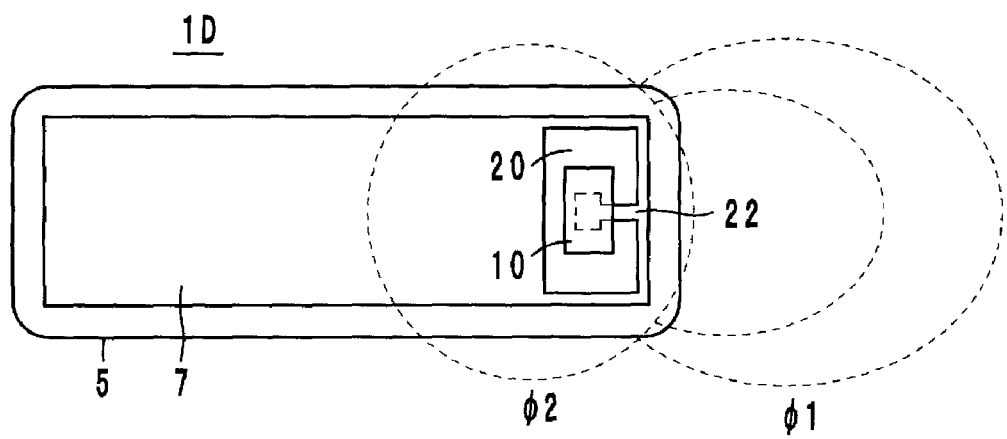
FIGS. 11A and 11B schematically illustrate a mobile communication terminal on which an antenna device according to a fourth preferred embodiment of the present invention, is mounted.
Figure 11B:
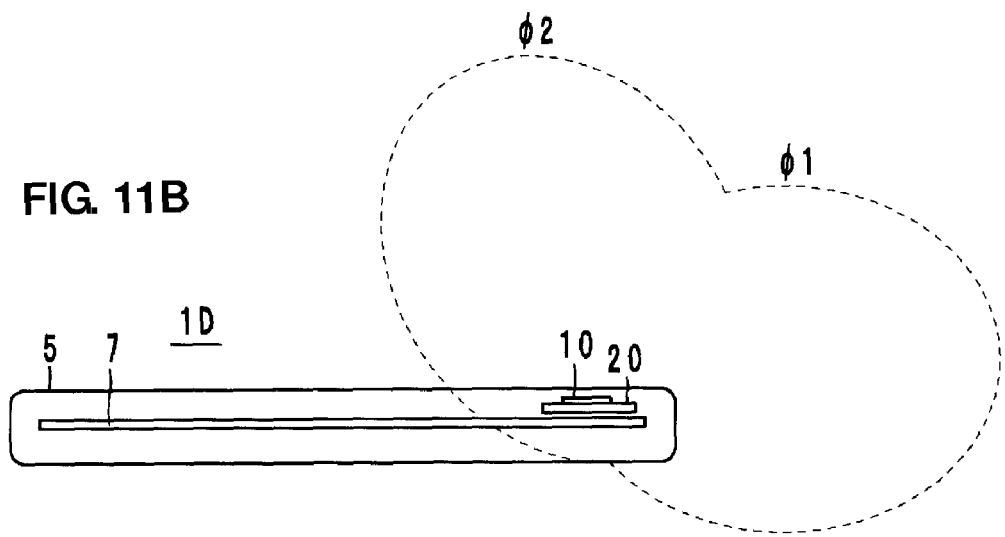

The antenna device 1D is the one in which the emitting member 20 overlaps a first end of the ground conductor 7 and the slit portion 22 faces the external portion of the terminal casing 5, as illustrated in FIG. 11. The magnetic flux $\phi 1$ and $\phi 2$ indicates the directivity of the magnetic fields.

Figure 12A:
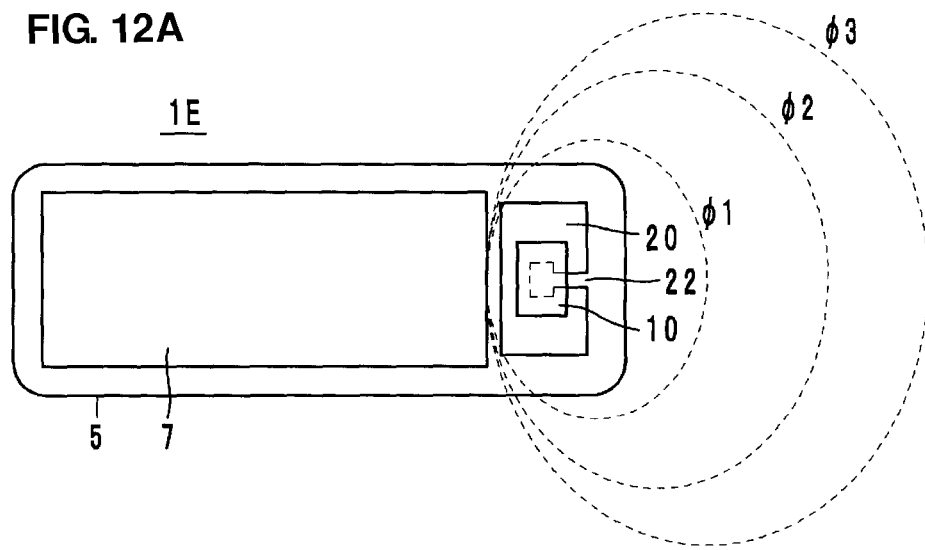
Figure 12B:
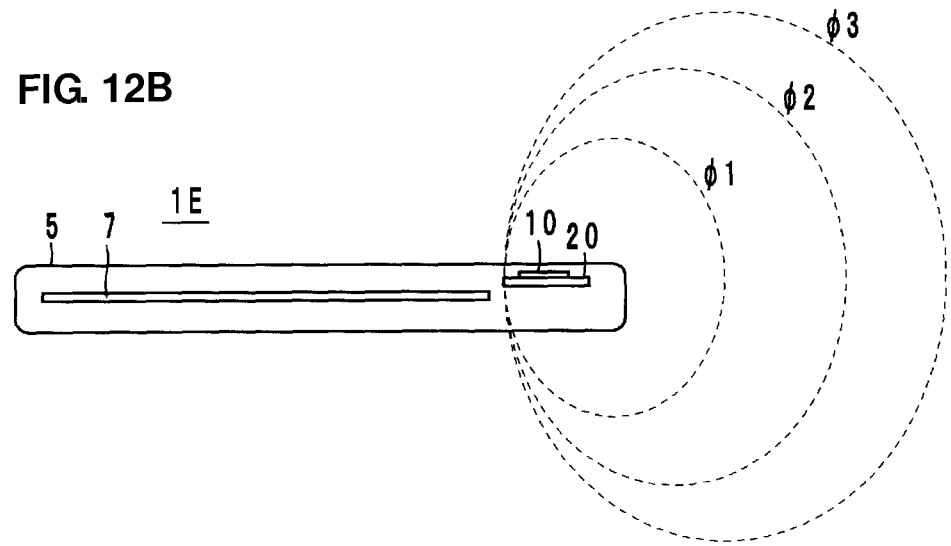

The antenna device 1E is the one in which the ground conductor 7 is cut out at the right-hand portion of the terminal casing 5, the emitting member 20 does not overlap the ground conductor 7, and the slit portion 22 faces the external portion of the terminal casing 5, as illustrated in FIG. 12. The magnetic flux $\phi 1$, $\phi 2$, and $\phi 3$ indicates the directivity of the magnetic fields.

Figure 13A:
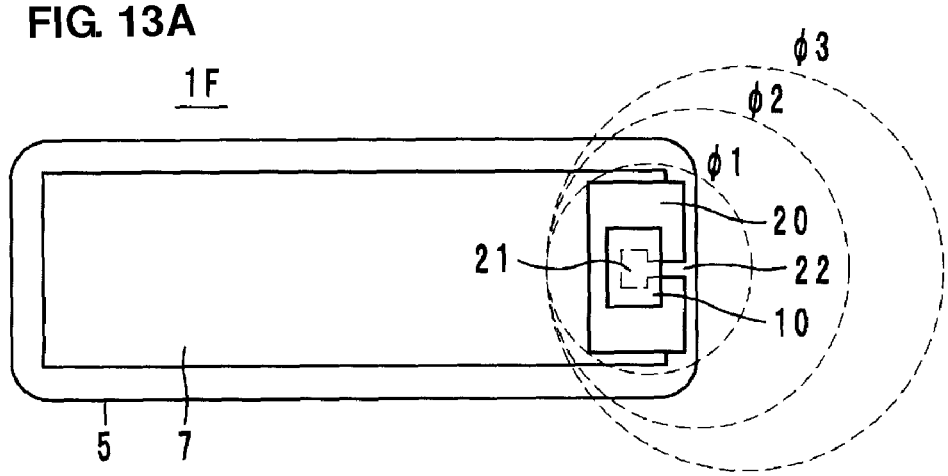
Figure 13B:
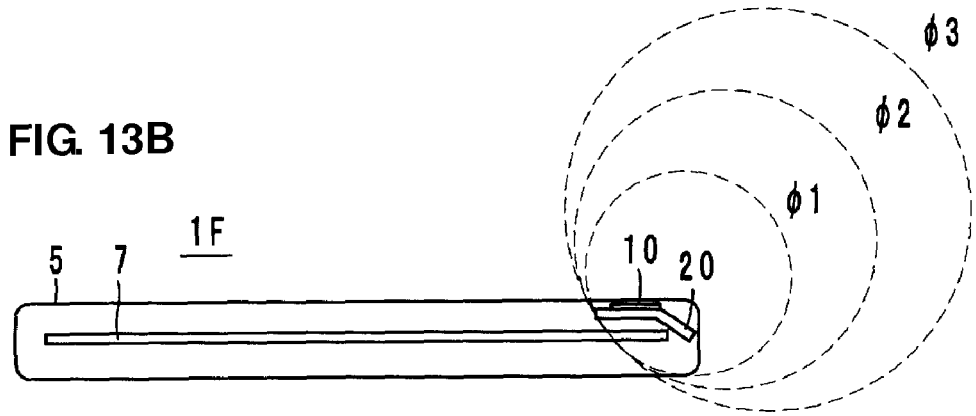
Figure 14A:
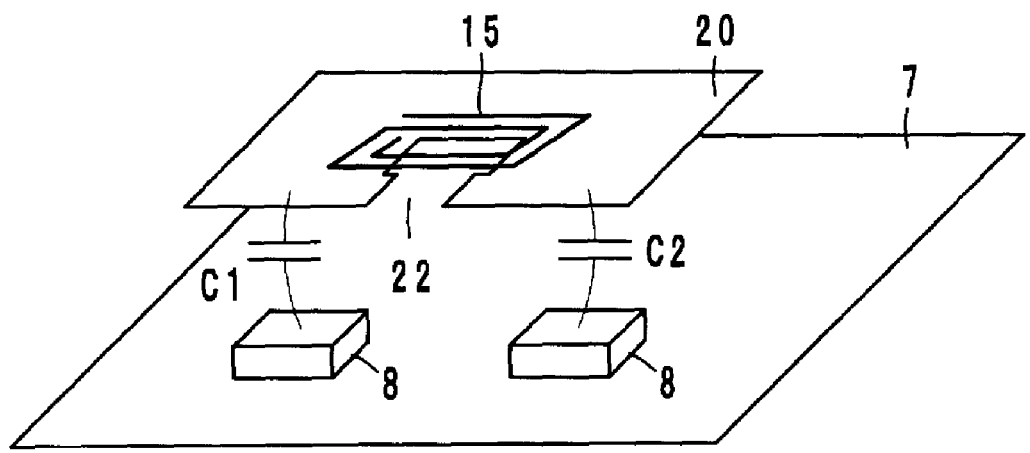
Figure 14B:
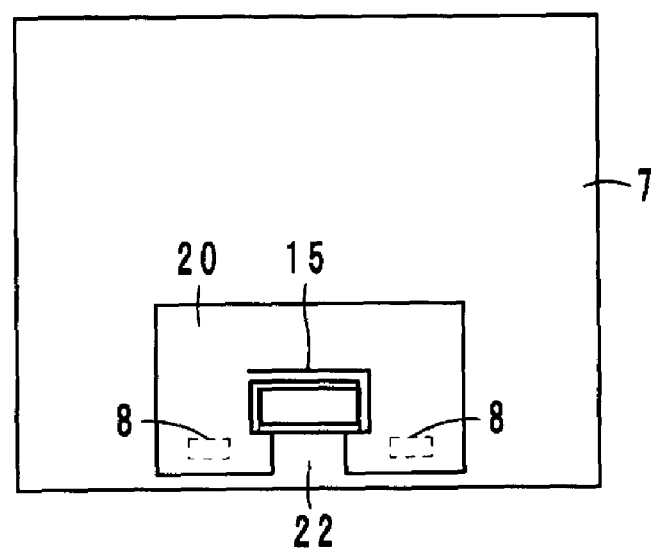

The antenna device 1F is the one in which the emitting member 20 is bent such that the slit portion 22 is tilted, the opening portion 21 overlaps a first end of the ground conductor 7, and the slit portion 22 faces the external portion of the terminal casing 5, as illustrated in FIG. 13. The magnetic flux $\phi 1$, $\phi 2$, and $\phi 3$ indicates the directivity of the magnetic fields.

Seventh Preferred Embodiment

An antenna device 1G, which is a seventh preferred embodiment, is the one in which two conductive members (capacitance assisting elements) 8 electrically connected to the ground conductor 7 are disposed and two capacitances C1 and C2 are generated between the conductive members 8 and the emitting member 20. The antenna device 1G is an application of the antenna device 1B, which is described in the above-described second preferred embodiment, and can efficiently feed the eddy-current energy consumed in the ground conductor 7 back to the emitting member 20. In particular, for the antenna device 1G, because conductive members 8 are arranged on both sides of the slit portion 22, respectively, the feedback of the eddy-current energy is efficient. The feedback of the eddy-current energy used here indicates that the ground conductor 7 is enabled to be used as a part of the emitting portion by the formation of a single resonant circuit containing the slit portion 22, the ground conductor 7, and the capacitances generated by the inclusion of the assisting capacitance element between the ground conductor 7 and each of the opposite ends of the slit portion 22 of the emitting member 20. Therefore, even when the emitting member 20 is adjacent to the ground conductor 7, magnetic field emission (or electric field emission) can be achieved, and emission of a magnetic field (or electric field) can also arise from the ground conductor 7. Here, the ground conductor 7 may be a metallic member other than the ground conductor, such as a battery of a cellular phone, a stray electrode pattern that is not electrically connected to any component, or a wiring pattern that allows another signal to pass therethrough.

As the capacitance assisting element to couple between the ground conductor 7 and the emitting member 20 to feed back the eddy-current energy, a chip capacitor placed between the ground conductor 7 and the emitting member 20 may be used. The same applies to the above-described second preferred embodiment (antenna device 1B).

Eighth Preferred Embodiment

Figure 15A:
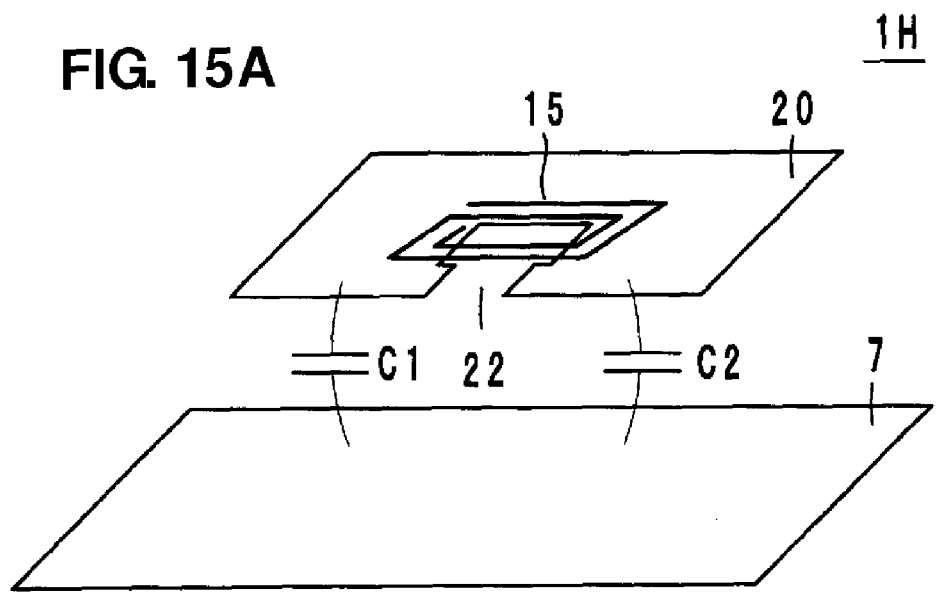
Figure 15B:
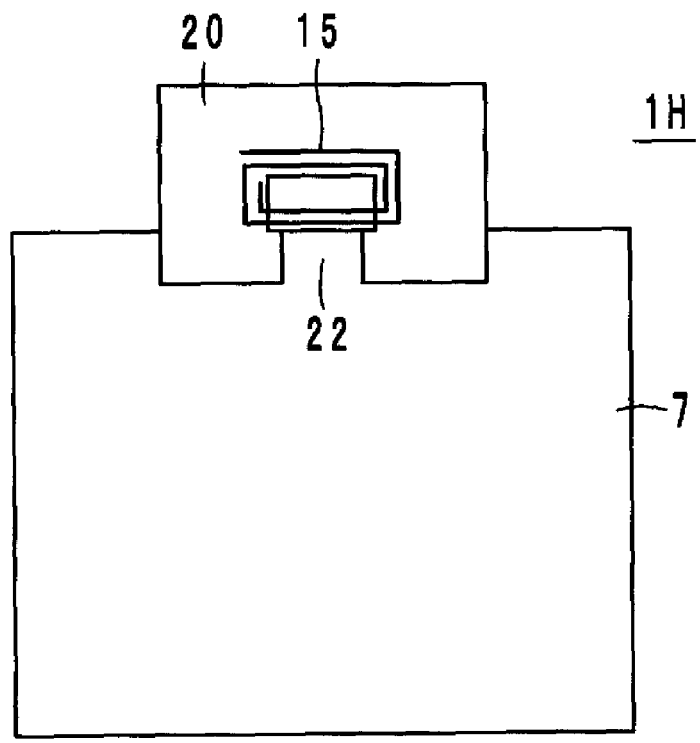

An antenna device 1H, which is an eighth preferred embodiment, is the one in which the emitting member 20 is arranged such that the slit portion 22 overlaps the edge portion of the ground conductor 7, as illustrated in FIG. 15. With this configuration, the emitting member 20 and the ground conductor 7 are coupled to each other by the capacitances C1 and C2, and the eddy-current energy can be fed back to the emitting member 20 without the inclusion of the conductive member 8 as the capacitance assisting element. It is to be noted that the antenna device 1H is allowed to include the capacitance assisting element.

In the above-described seventh and eighth preferred embodiments, the inductance of the emitting member 20, the capacitances between the emitting member 20 and the ground conductor 7, and the inductance of the ground conductor 7 define a resonant circuit. The resonant frequency of that resonant circuit may preferably be set at a value higher than the communication frequency of a signal transmitted or received by the emitting member 20. For example, if the present antenna device is used in an RFID system, the resonant frequency of that resonant circuit can be set at, for example, about 15.04 MHz, which is slightly higher than a communication frequency of about 13.56 MHz. With this, the present antenna device and the reader-writer antenna are magnetically coupled, and communication is made.

Other Preferred Embodiments

The antenna device and mobile communication terminal according to the present invention are not limited to the above-described preferred embodiments. Various changes can be made within the scope of the present invention.

In particular, the cellular phone as the mobile communication terminal is illustrative only, and the present invention can be applied in various types of mobile communication terminals. The conductor member coupling to the emitting member is not limited to the ground conductor described above and may be a metallic casing of the terminal.

As described above, preferred embodiments of the present invention is useful in the antenna device and mobile communication terminal, and, in particular, it is advantageous in that the gain of transmit and receive signals can be increased and the communication distance can be increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a feeding member including a coil pattern;
an emitting member arranged to emit a transmit signal supplied from the feeding member and/or to receive a receive signal and supply the receive signal to the feeding member; and
a conductor member that is opposed to the emitting member; wherein
the emitting member includes an opening portion and a slit portion communicating with the opening portion, and, when seen in plan view from a direction of a winding axis of the coil pattern, the opening portion of the emitting member and an inner region of the coil pattern overlap each other at least partially and the emitting member and the coil pattern overlap each other at least partially; and
the conductor member and the emitting member are coupled to each other through a capacitance.

2. The antenna device according to claim 1, wherein, during emission of the transmit signal, an inductive current is excited at an area around the opening portion of the emitting member by a current passing through the coil pattern, the inductive current causes a magnetic field and an electric field, and the magnetic field and the electric field spreading throughout the emitting member enable the emitting member to operate as an electric field antenna.

3. The antenna device according to claim 1, wherein the coil pattern and the emitting member are electromagnetically coupled to each other.

4. The antenna device according to claim 1, wherein, when seen in plan view from the direction of the winding axis of the coil pattern, the opening portion of the emitting member and the inner region of the coil pattern overlap each other substantially entirely, and the opening portion and the inner region have substantially the same area.

5. The antenna device according to claim 1, wherein the feeding member includes a stack in which a plurality of dielectric layers are stacked on each other, the coil pattern includes a plurality of ring-shaped conductors arranged on the plurality of dielectric layers, the ring-shaped conductors are helically connected through an interlayer conductor, and the winding axis of the coil pattern extends along a stacking direction of the stack.

6. The antenna device according to claim 5, wherein each of the ring-shaped conductors on the dielectric layers comprises a plurality of parallel line conductors spaced at a predetermined interval.

7. The antenna device according to claim 1, wherein the coil pattern has a predetermined resonant frequency, and the transmit signal and/or the receive signal has a frequency that substantially corresponds to the resonant frequency.

8. The antenna device according to claim 1, wherein the area of the emitting member is larger than an area of a portion where the coil pattern is located.

9. The antenna device according to claim 1, wherein the conductor member and the emitting member are coupled to each other through a capacitance assisting element.

10. The antenna device according to claim 9, wherein the capacitance assisting element is disposed between the conductor member and the emitting member, the capacitance assisting element is electrically connected to the conductor member, and the capacitance is generated between the capacitance assisting element and the emitting member.

11. The antenna device according to claim 9, wherein the capacitance assisting element is adjacent to the slit portion.

12. The antenna device according to claim 9, wherein the capacitance assisting element includes two capacitance assisting elements, the two capacitance assisting elements being provided at both sides of the slit portion, respectively.

13. The antenna device according to claim 1, wherein an edge of the conductor member and the slit portion overlap each other.

14. A mobile communication terminal comprising:
a feeding member including a coil pattern;
an emitting member arranged to emit a transmit signal supplied from the feeding member and/or to receive a receive signal and supply the receive signal to the feeding member;
a conductor member that is opposed to the emitting member; and
a casing in which the feeding member, the emitting member, and the conductor member are located; wherein
the emitting member includes an opening portion and a slit portion communicating with the opening portion, and, when seen in plan view from a direction of a winding axis of the coil pattern, the opening portion of the emitting member and an inner region of the coil pattern overlap each other at least partially and the emitting member and the coil pattern overlap each other at least partially; and
the conductor member and the emitting member are coupled to each other through a capacitance.

15. The mobile communication terminal according to claim 14, wherein the conductor member and the emitting member are coupled to each other through a capacitance assisting element.

16. The mobile communication terminal according to claim 15, wherein the conductor member is a ground conductor on a printed circuit board.

\* \* \* \* \*